United States Patent
Lee et al.

(10) Patent No.: US 8,365,854 B2
(45) Date of Patent: Feb. 5, 2013

(54) DUAL AIR DUCT FOR FRONT END OF VEHICLE

(75) Inventors: Jonghoon Lee, Hwaseong-si (KR); Jongwoo Nam, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1078 days.

(21) Appl. No.: 12/342,724

(22) Filed: Dec. 23, 2008

(65) Prior Publication Data

US 2009/0298410 A1 Dec. 3, 2009

(30) Foreign Application Priority Data

May 29, 2008 (KR) .................. 10-2008-0050145

(51) Int. Cl.
*B60K 11/00* (2006.01)
(52) U.S. Cl. .................. 180/68.1; 180/68.4; 180/68.6
(58) Field of Classification Search ........ 180/68.1–68.5; 165/41, 100, 903
See application file for complete search history.

(56) References Cited

U.S. PATENT DOCUMENTS

| | | | | |
|---|---|---|---|---|
| 4,651,816 A | * | 3/1987 | Struss et al. | 165/76 |
| 5,046,550 A | * | 9/1991 | Boll et al. | 165/41 |
| 5,123,695 A | * | 6/1992 | Kanemitsu et al. | 296/193.09 |
| 5,358,304 A | * | 10/1994 | Kanemitsu et al. | 296/193.09 |
| 5,918,663 A | * | 7/1999 | Hoglinger et al. | 165/41 |
| 6,394,210 B2 | * | 5/2002 | Matsuda et al. | 180/68.1 |
| 6,827,129 B2 | * | 12/2004 | Ozawa et al. | 165/67 |
| 6,922,925 B2 | * | 8/2005 | Watanabe et al. | 37/466 |
| 7,383,905 B2 | * | 6/2008 | Lang et al. | 180/68.1 |
| 7,784,576 B2 | * | 8/2010 | Guilfoyle et al. | 180/68.1 |
| 7,814,963 B2 | * | 10/2010 | Adamson et al. | 165/41 |
| 8,011,466 B2 | * | 9/2011 | Honzek et al. | 180/68.4 |
| 8,042,635 B2 | * | 10/2011 | Kang | 180/68.4 |
| 8,220,576 B2 | * | 7/2012 | Terada et al. | 180/68.4 |
| 2002/0079151 A1 | * | 6/2002 | Decker et al. | 180/68.4 |
| 2006/0102109 A1 | * | 5/2006 | Becker et al. | 123/41.48 |
| 2006/0254838 A1 | * | 11/2006 | Ino et al. | 180/68.1 |

FOREIGN PATENT DOCUMENTS

KR 10-0514534 9/2005

* cited by examiner

*Primary Examiner* — Katy M Ebner
(74) *Attorney, Agent, or Firm* — Morgan, Lewis & Bockius LLP (57) ABSTRACT

A dual air duct of a vehicle may include an upper duct that guides running wind flowing outside an intercooler through a radiator grill to upper portion of the intercooler and a lower duct that guides running wind flowing outside the intercooler through a hole of a bumper cover to lower portion of the intercooler.

17 Claims, 7 Drawing Sheets

DUAL AIR DUCT FOR FRONT END OF VEHICLE

CROSS-REFERENCE TO RELATED APPLICATIONS

The present application claims priority to Korean Application Number 10-2008-0050145 filed May 29, 2008, the full contents of which are incorporated herein for all purposes by this reference.

FIELD OF THE INVENTION

The present invention relates to a dual air duct disposed at the front end in a vehicle that improves cooling performance of an intercooler and a condenser by guiding a running wind that flows into the engine compartment when the vehicle is traveling.

BACKGROUND OF THE INVENTION

Figure 1:
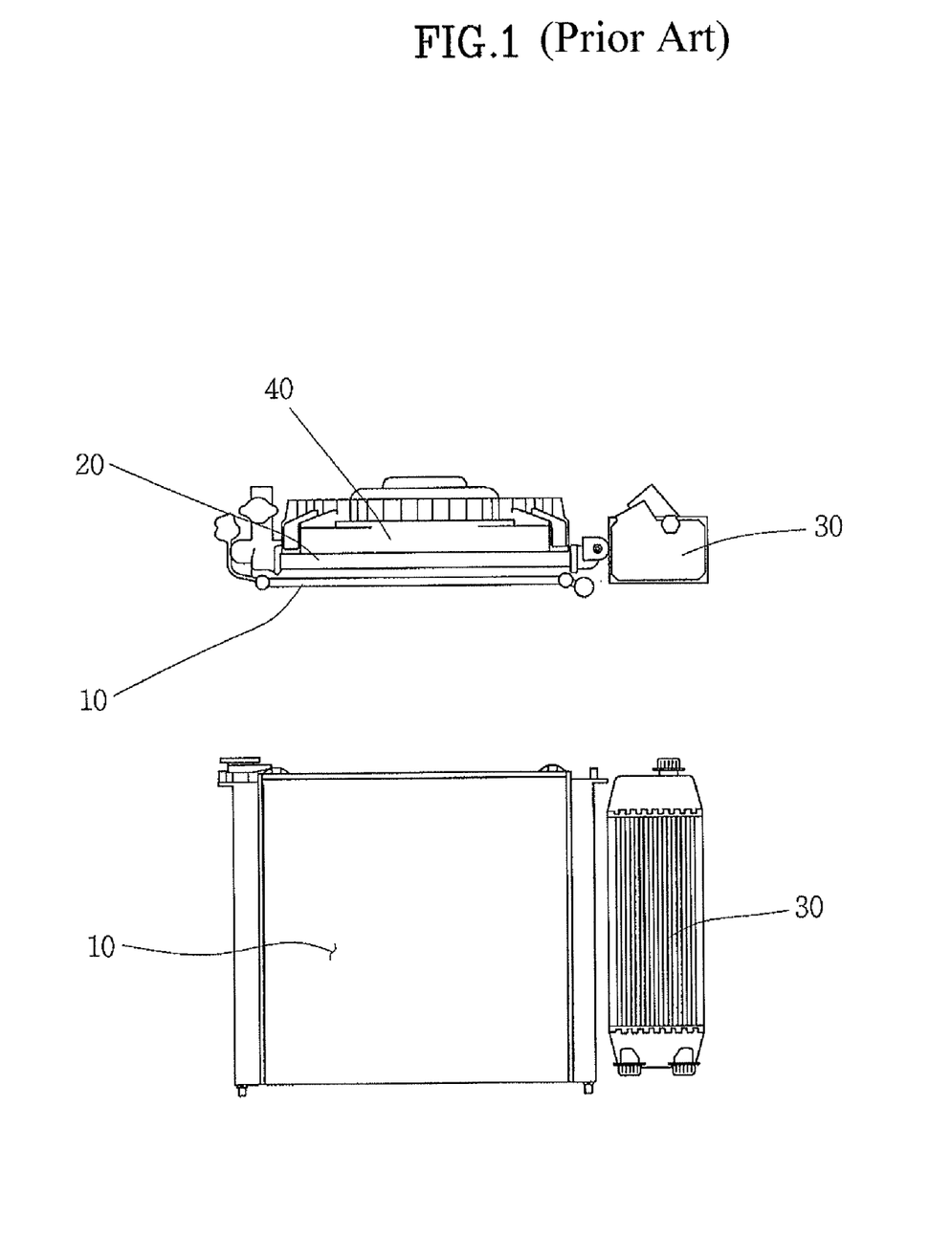
FIG. 1 shows a plan view and a front view of a condenser, a radiator, and an intercooler that are disposed at the front end of a vehicle.

As shown in FIG. 1, a condenser 10 of a cooling system, a radiator 20 of an engine cooling system, and an intercooler 30 that cools oversupplied air in a turbocharger engine are disposed in the front end of a vehicle to cool the running wind that flows into the engine compartment when the vehicle is traveling.

In general, condenser 10 is disposed at the very front, radiator 20 is disposed closely behind condenser 10, and intercooler 30 is disposed parallel to sides of condenser 10 and radiator 20 in a side-by-side manner shown in the figure.

Further, a cooling fan 40 that sucks air and sends the air to the engine is disposed behind radiator 20.

Therefore, when the vehicle is traveling, the running wind that flows into the vehicle through a radiator grill and holes formed at the lower portion of a bumper cover cools a coolant, cooling water, and an intake air by taking heat from the heat sinks while passing through condenser 10, radiator 20, and intercooler 30.

On the other hand, as cooling performance of condenser 10 is improved, interior cooling of the vehicle is improved, such that radiator 20 can more effectively prevent overheat of the engine and charging efficiency of intercooler 30 is improved, and as result, the engine power is increased and the fuel consumption is decreased.

Therefore, it is preferable to increase the areas of the radiator grill or the holes of the bumper cover to improve the cooling performance of the heat sinks.

However, the radiator grill and the bumper cover make the front appearance of the vehicle, such that they are important factors in design of the front appearance of the vehicle. Accordingly, increasing the areas of the holes restricts design and it is a design trend to decrease the areas of the holes.

Therefore, since it is difficult to sufficiently increase the areas of the holes, cooling performance of the heat sinks, engine cooling, and engine power may decrease fuel consumption may increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a dual air duct of the front end in a vehicle that improves the cooling performance with high engine power, decrease the fuel consumption, and secures sufficient cooling performance for the engine by improving the cooling performance of the condenser and the intercooler and minimizing reduction of the cooling performance of the radiator, without restricting design and deteriorating the front appearance of the vehicle.

In an exemplary embodiment of the present invention, a dual air duct of a vehicle may include an upper duct that guides running wind flowing outside an intercooler through a radiator grill to upper portion of the intercooler, and/or a lower duct that guides running wind flowing outside the intercooler through a hole of a bumper cover to lower portion of the intercooler.

The upper duct may include a main body having a rear opening in a rear portion thereof and a guide extending from the rear opening toward front of the condenser to receive the running wind therethrough.

The guide of the upper duct may extend between front right upper portion of the condenser and the upper portion of the intercooler.

The guide may extend in a curve shape from the rear opening toward the front of the condenser.

The rear opening may be inclined downwards from the guide so as to guide the running wind downwards to be concentrated to the upper portion of the inter cooler.

The guide may have an upper flange that is formed throughout upper portion thereof and a lower flange that is formed through lower portion thereof and then inclined in a curve shape in diagonally upper direction within the main body.

A blocking plate that blocks a gap between the condenser and the intercooler may be formed under a portion connecting the main body with the guide.

The blocking plate may include an inclined portion to guide the running wind to the condenser.

In another aspect of the present invention, the lower duct may include a main body that has a rear opening in a rear portion thereof, and/or a guide that extends from the rear opening toward the hole of the bumper cover disposed at front of the vehicle.

An expanding portion may be formed at the guide and extends to the outside of the intercooler. The expanding portion may extend from the guide to the outside of the intercooler in a curve shape.

An opening disposed in a middle portion of the guide may be smaller than the rear opening so as to increase flow speed of the running wind.

The guide may be inclined upwards so as to guide the running wind upwards to be concentrated to the lower portion of the intercooler. A blocking plate may be formed to the main body and configured to block a gap between the condenser and the intercooler.

The blocking plate may include an inclined surface that is inclined downwards from the main body toward the condenser in a traverse direction of the vehicle.

The upper duct and the lower duct may be integrally formed. Main bodies and blocking plates of the upper and lower ducts may be integrally formed.

The upper duct and lower duct may be fastened to a front end module of a vehicle body.

The upper duct and lower duct may be fastened to an upper cover and a lower stiffener.

A dual air duct of a front end in a vehicle according to an exemplary embodiment of the present invention includes an upper duct that guides running wind flowing to the outside of an intercooler through a radiator grill to the upper portion of the intercooler, and/or a lower duct that guides running wind flowing to the outside of the intercooler through a hole of a bumper cover to the lower portion of the intercooler.

Blocking plates that block a gap between the condenser and the intercooler are provided to the upper duct and the lower duct.

According to an exemplary embodiment of the present invention as described above, it is possible to improve the cooling performance of the vehicle with high engine power and decrease the fuel consumption while securing sufficient cooling performance for the engine by improving the cooling performance of the condenser and the intercooler.

Further, the invention has the effect of reducing restriction on design because it has substantially no effect on the design of the front appearance of the vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
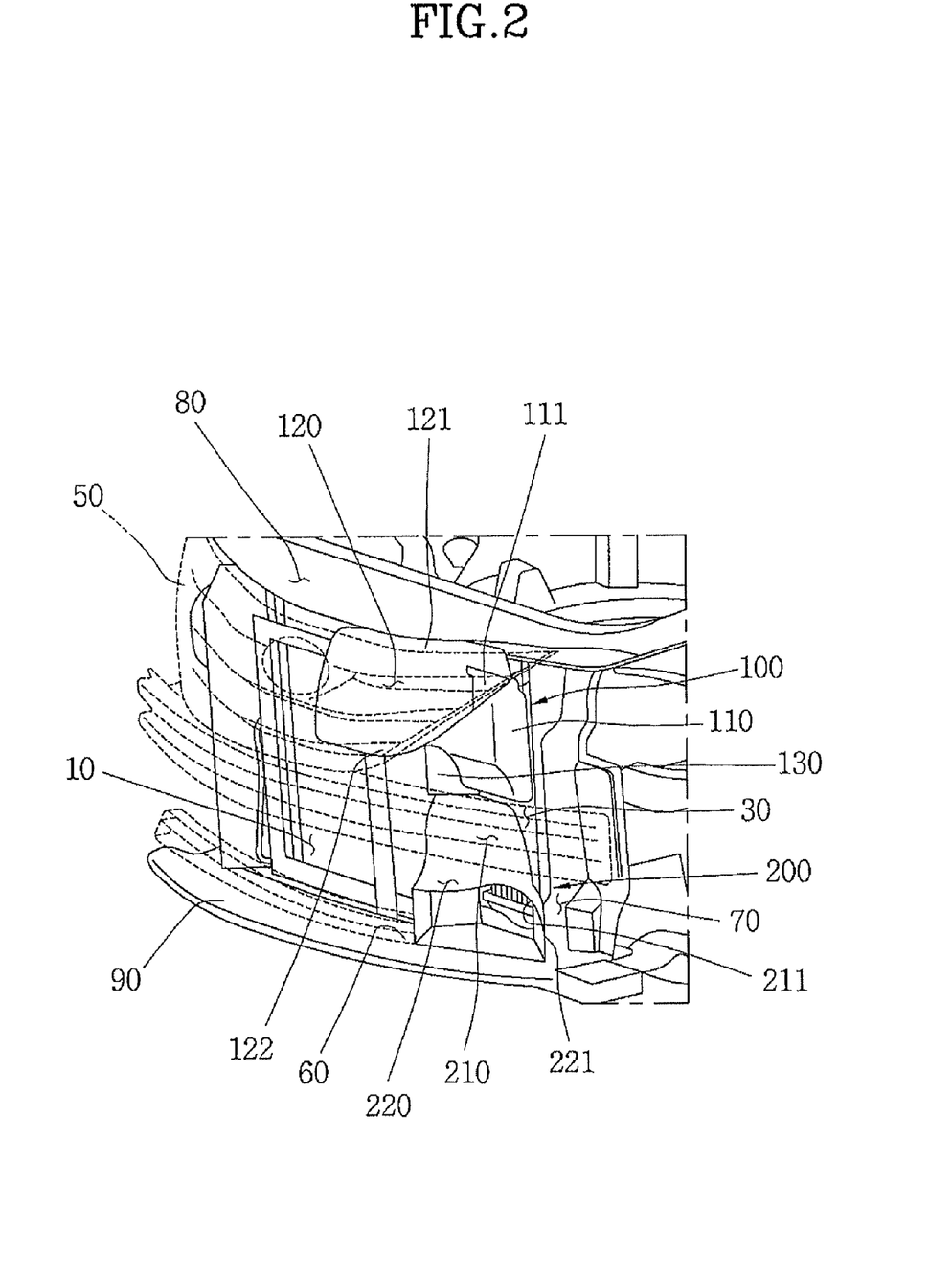
FIG. 2 is a perspective view illustrating installation of a dual air duct according to an exemplary embodiment of the present invention.
Figure 3:
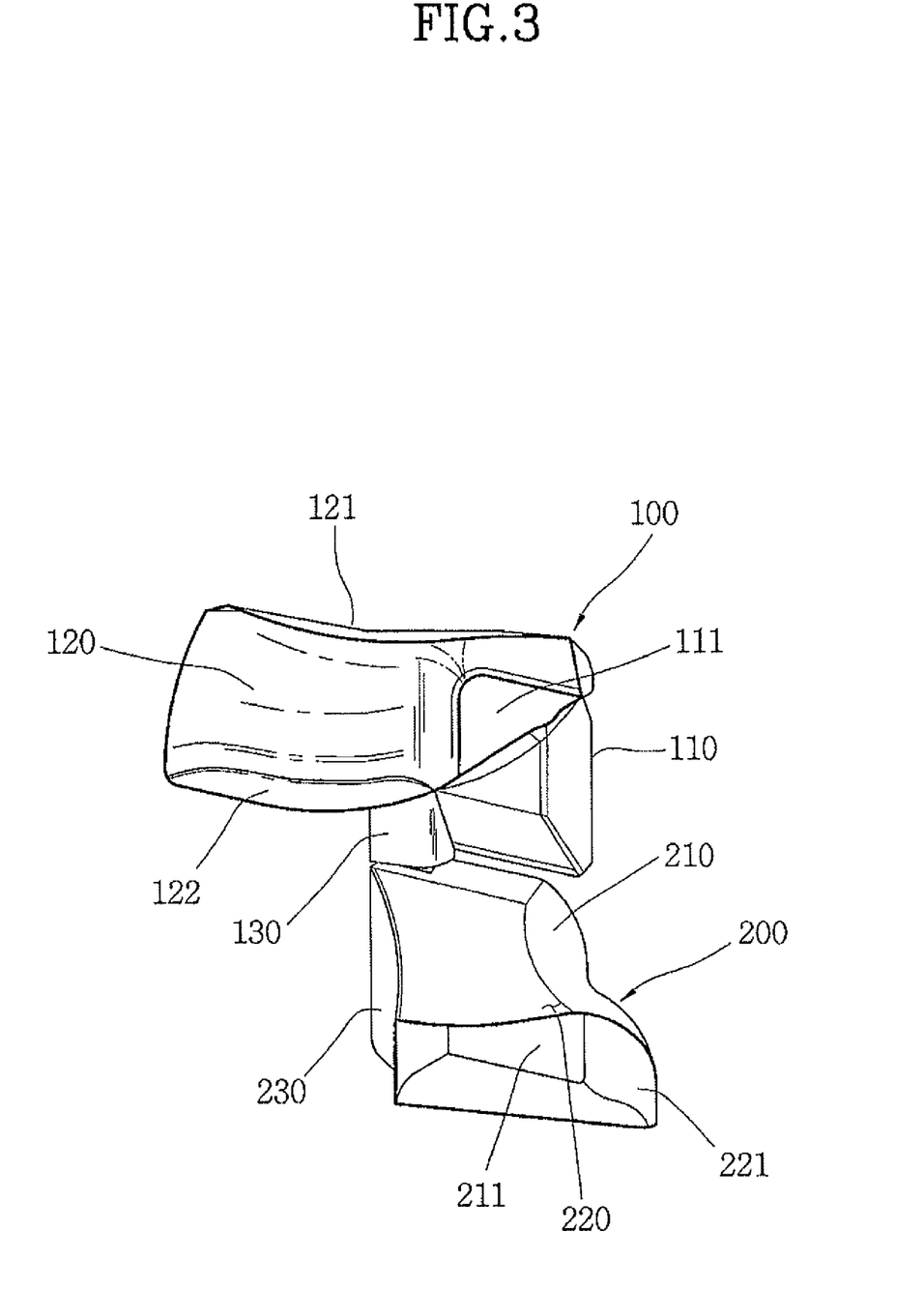
FIG. 3 is a front perspective view of the dual air duct.

As shown in the FIGS. 2 and 3, the dual air duct according to an exemplary embodiment of the present invention includes an upper duct 100 and a lower duct 200 disposed in a vertical direction in series.

Upper duct 100 and lower duct 200 are disposed in front of an intercooler 30.

Upper duct 100 includes a main body 110 with a rectangular rear opening 111 having substantially the same width as intercooler 30 wherein the rectangular rear opening 111 of the main body 10 is disposed in front of the intercooler 30.

The upper duct 100 further includes a guide 120 that extends in a smooth curve shape from a side of main body 110 toward the front of a condenser 10 and is disposed between the condenser 10 and a radiator grill 50.

That is, guide 120 extends from a side of rear opening 111 toward the front of the vehicle, more extending in a smooth curve shape toward the middle of the vehicle body in the traverse direction thereof, and then further extends again toward the front of the vehicle body in a smooth curve shape.

In an exemplary embodiment of the present invention, the rear opening 111 of the main body 110 is inclined downwards with a predetermined angle so that the running wind or air flow passing through the guide 120 flows downwards. Accordingly the running wind can be concentrated onto the intercooler 30 more effectively.

Further, guide 120 has flanges 121, 122 that horizontally protrude from the upper and lower portion of the guide 120 toward the front of the vehicle body, in which upper flange 121 and lower flange 122 connect the guide 120 and the opposite upper corner of main body 110 with the vehicle body.

To achieve the above configuration, the entire upper flange 121 is horizontally formed and lower flange 122 is in parallel with upper flange 121 within guide 120 and makes smooth curve that is diagonally inclined upward within main body 110.

Further, a blocking plate 130 having a rectangular plate shape is formed under the connecting portion of main body 110 with guide 120.

Blocking plate 130 is sufficiently wide enough to block a gap between condenser 10 and intercooler 30 to stop air flow through the gap.

In another exemplary embodiment of the present invention, blocking plate 130 of upper duct 100 may have an inclined portion to guide the running wind that flows outside the condenser 10 to condenser 10.

On the other hand, lower duct 200 includes a main body 210 with a rectangular rear opening 211 (with the right upper corner rounded) having the same width as that of the intercooler 30.

The lower duct 200 further includes a guide 220 that extends from rear opening 211 toward the front of the vehicle, has an expanding portion 221, of which an end expands outside the intercooler 30, and is disposed behind a hole 60 formed through the a bumper cover.

The surface from the end of expanding portion 221 to rear opening 211 makes a smooth curve.

In an exemplary embodiment of the present invention, opening at middle portion of the guide 220 of the lower duct may be smaller than rear opening 211 so that flow speed of the running wind is increased while the running wind passes the middle portion of the guide 220.

Figure 4:
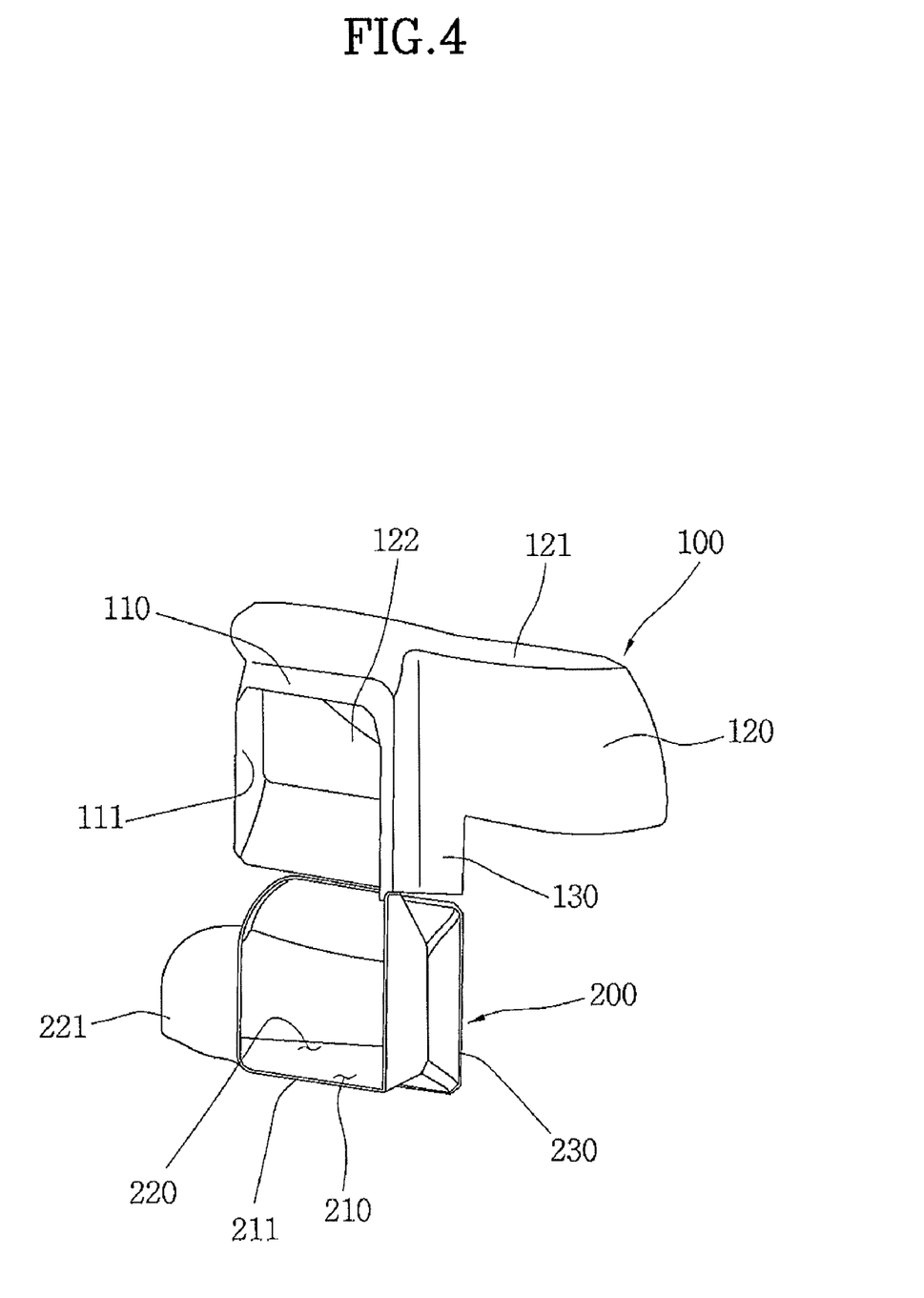
FIG. 4 is a rear perspective view of the dual air duct.

Further, a rectangular blocking plate 230 that is wide substantially enough to block a gap between condenser 10 and intercooler 30 is formed at one side thereof facing inner surface of the vehicle body of main body 210.

Blocking plate 230 has an inclined surface with the portion facing main body 210 disposed toward the front of the vehicle body and the opposite portion facing the rear of the vehicle body. In this configuration, the blocking plate 230 of lower duct 220 guides the running wind that flows outside the condenser 10 to condenser 10.

The upper duct 100 and lower duct 200 are fastened to a front end module 70 of the vehicle body or an upper cover 80 and a lower stiffener 90 (an energy absorber disposed in the bumper cover) which are attached to the upper and lower portions of front end module 70, by appropriate fasteners, such as bolts, rivets, grommets, and clips.

In particular, lower stiffener 90 has a honey comb shape (i.e. lattice with various shapes), such that it may be possible to form protrusions, which are inserted into grooves of lower stiffener 90, on the lower side of lower duct 200 to attaching lower stiffener.

However, this structure can be appropriately selected by a skilled person in the art, if needed, and not limited to a specific structure.

Further, upper duct 100 and lower duct 200 each may be integrally formed, as one unit, with main bodies 110, 210 and blocking plates 130, 230, respectively.

The effect of an exemplary embodiment of the present invention is described hereafter.

Figure 5:
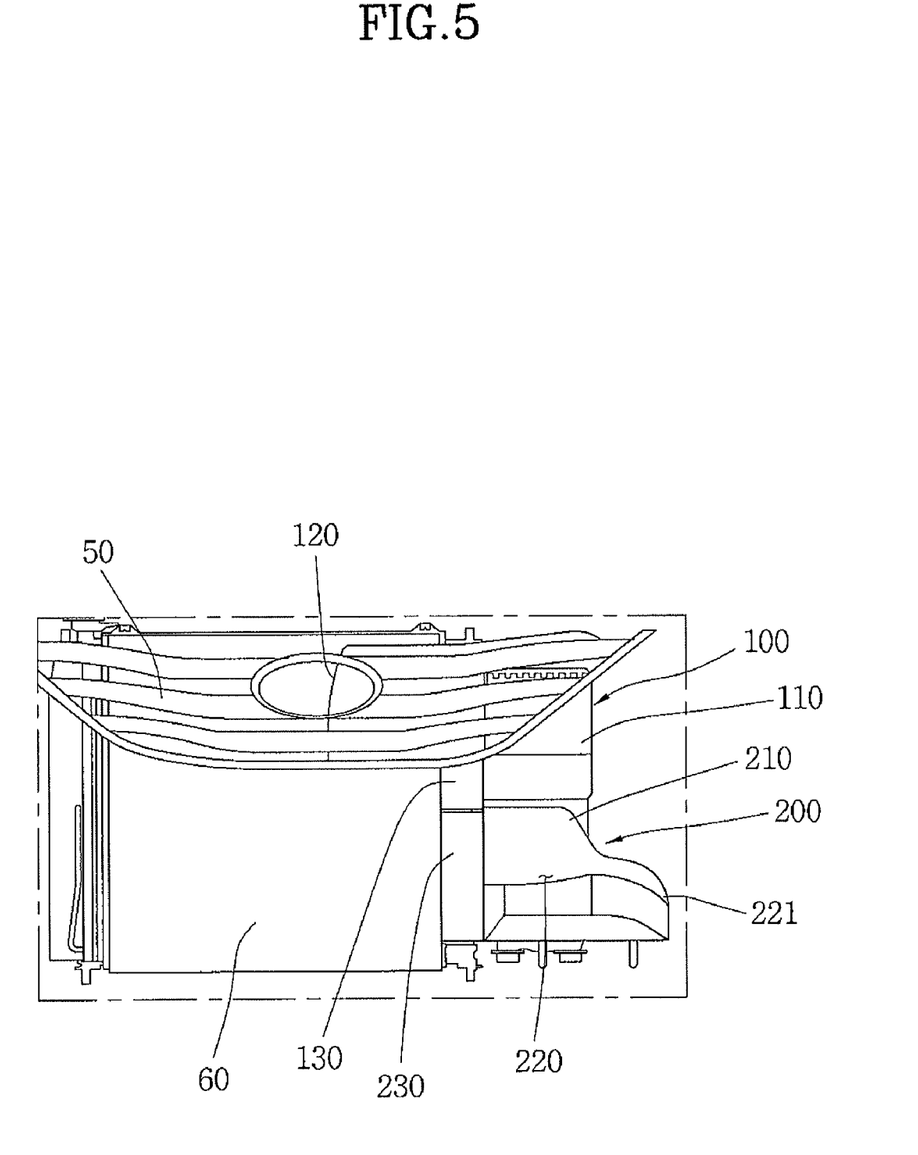
FIG. 5 is a front view illustration installation of the dual air duct.
Figure 6:
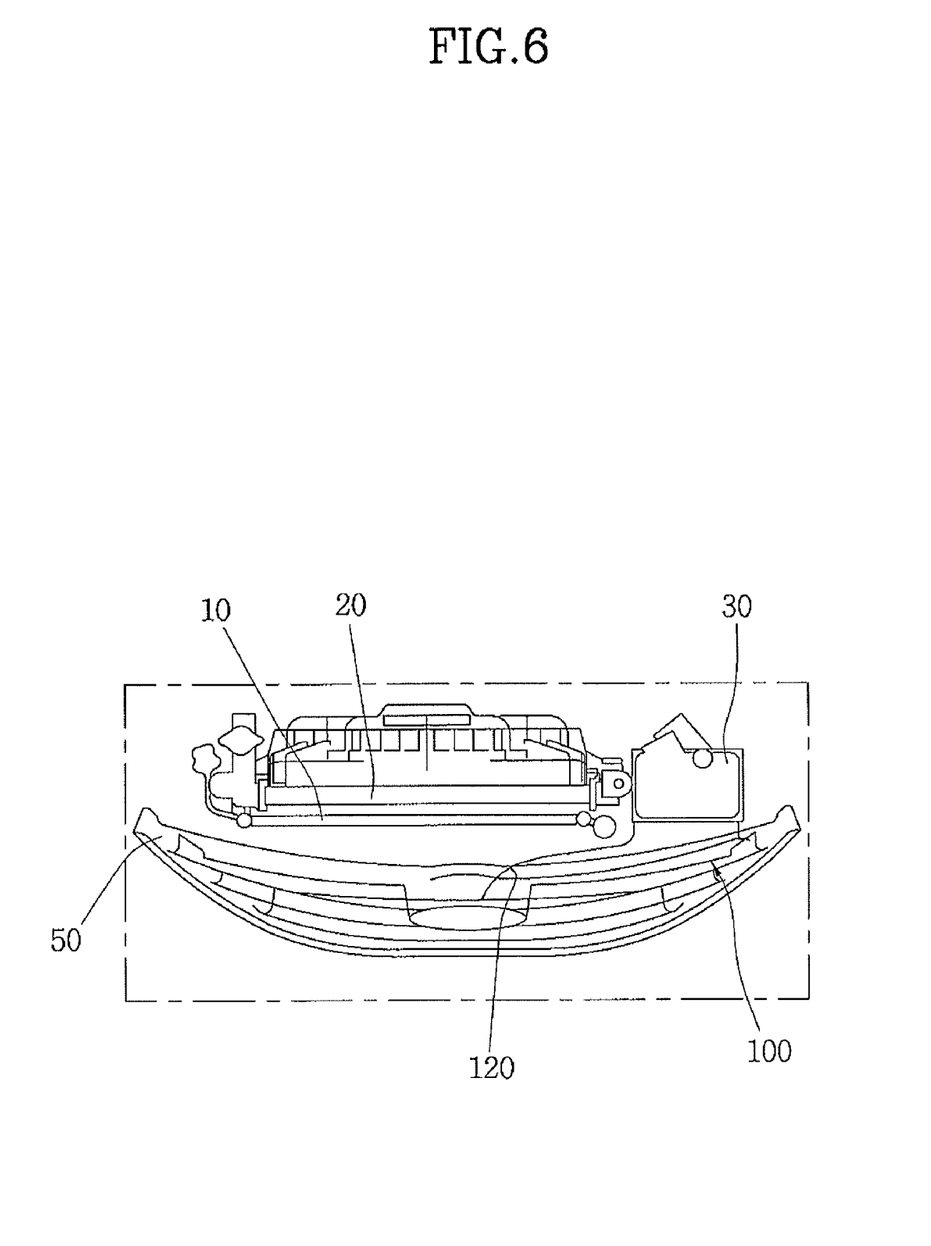
FIG. 6 is a view illustrating that running wind is guided by an upper duct of the dual air duct.
Figure 7:
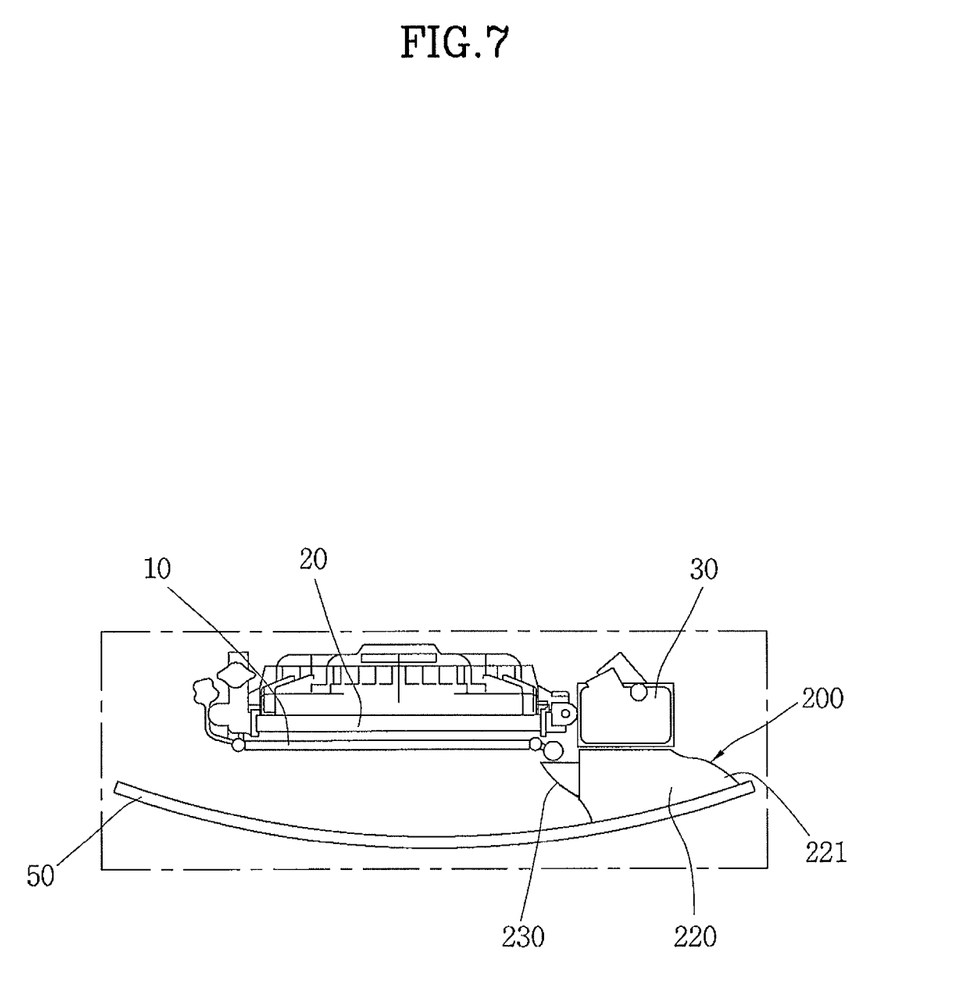
FIG. 7 is a view illustrating that running wind is guided by a lower duct of the dual air duct.

FIG. 5 is a front view illustrating installation of upper duct 100 and lower duct 200. FIG. 6 illustrates that running wind outside intercooler 30 is guided into intercooler 30 by upper duct 100 and FIG. 7 illustrates that running wind outside intercooler 30 is guided into intercooler 30 by lower duct 200 and running wind outside condenser 10 is guided into the intercooler 30.

Rear openings 111, 211 of upper duct 100 and lower duct 200 are is close contact with the front upper and lower portions of intercooler 30, respectively.

Guide 120 of upper duct 100 is disposed at the front right upper portion of condenser 10 and guides the running wind that flows to the outside of intercooler 30 to the upper portion of intercooler 30.

Therefore, the running wind that is guided by guide 120 is additionally provided to intercooler 30 in addition to running wind that is directly guided to intercooler 30 through radiator grill 50 in the related art, such that the cooling performance of intercooler 30 is improved.

In particular, high-temperature air that is compressed by a turbocharger is provided to the upper portion of intercooler 30, such that it is possible to further improve the cooling performance by concentrating the outside air to the upper portion.

Since guide 220 of lower duct 200 has expanding portion 221 that expands outside the vehicle body, lower duct 200 can also guide running wind that flows at the outside of intercooler 30 to the lower side of intercooler 30.

Therefore, because additional running wind is provided by guide 220 having expanding portion 221 in addition to the running wind that is directly provided to the lower portion of intercooler 30 through hole 60 of the bumper cover, the cooling performance of intercooler 30 is improved.

Meanwhile, blocking plate 230 of lower duct 220 having an inclined portion guides the running wind that flows to the outside of condenser 10 to condenser 10.

Since lower duct 200 is disposed under condenser 10, the running wind that is guided by blocking plate 230 of lower duct 200 is provided to a region under condenser 10.

The region under condenser 10 is where a liquefied coolant flows and it is important that the liquid coolant flows under a subcooled state to a throttle valve through the region. When a non-subcooled coolant flows to the throttle valve, a portion of the coolant is evaporated by pipe resistance, such that it disturbs operation of the throttle valve and significantly decreases the cooling performance.

In consideration of the above phenomenon, the cooling performance can be improved by additionally guide the running wind to the region under condenser 10 such that the liquefied coolant is completely subcooled.

On the other hand, the gap between condenser 10 and intercooler 30 is blocked by blocking plates 130, 230 of upper duct 100 and lower duct 200 (the inside of guide 120 has the same operation in the upper duct), running wind is guided to condenser 10 by blocking plates 130, 230.

Therefore, the running wind that has passed outside the condenser 10 in the related art is provide to the front of condenser 10 and cools condenser 10.

This is the same as in radiator 20, in which there is a factor that decreases the cooling performance because the inflow area of the running wind is decreased by guide 120 of upper duct 100. However, since the running wind is additionally provided by blocking plates 130, 230 as described above, such that it is possible to reduce the factor decreasing the cooling performance and minimize decrease of the cooling performance.

The following table compares test data before and after the dual air duct according to an exemplary embodiment of the present invention is equipped.

| Item | Before equipped | After equipped |
|---|---|---|
| Intercooler Lower Tank Temperature | 72° C. | 54° C. |
| Radiator Top Tank Temperature | 107.6° C. | 108° C. |
| Cabin Air Temperature | 25.4° C. | 24° C. |
| Engine Power | 168 PS | 173 PS |
| Fuel Consumption | Reference | 4.0% reduced |

Referring to the table, it can be seen that when the present invention is applied, the cooling performance of condenser 10 is improved and the vehicle cool-down performance of the vehicle is correspondingly improved. Further, the cooling performance of intercooler 30 is improved, such that the engine power is improved and the fuel consumption is reduced. Furthermore, it can be also seen from the table that the cooling performance of radiator 20 when the present invention is applied is not largely decreased.

For convenience in explanation and accurate definition in the appended claims, the terms "upper", "lower", "front", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dual air duct of a vehicle, comprising:
   an upper duct that guides running wind flowing outside an intercooler through a radiator grill to an upper portion of the intercooler, wherein the intercooler and a condenser are disposed in a traverse direction of the vehicle, and wherein, to guide a portion of the running wind lost by a gap between the intercooler and the condenser, the upper duct includes:
   a main body having a rear opening in a rear portion thereof; and
   a guide extending from the rear opening toward front of the condenser to receive the air flow therethrough; and a lower duct that guides air flow flowing outside the intercooler through a hole of a bumper cover to a lower portion of the intercooler, wherein the lower duct includes:
   a main body that has a rear opening in a rear portion thereof; and
   a guide that extends from the rear opening toward the hole of the bumper cover disposed at front of the vehicle;
wherein a blocking plate that seals the gap is formed under a portion connecting the main body of the upper duct with the guide of the upper duct;
wherein the main body of the upper duct and the main body of the lower duct are positioned adjacent to a front surface of the intercooler.

2. The dual air duct as defined in claim 1, wherein the guide of the upper duct extends between front right upper portion of the condenser and the upper portion of the intercooler.

3. The dual air duct as defined in claim 2, wherein the guide of the upper duct extends in a curve shape from the rear of the upper duct opening toward the front of the condenser.

4. The dual air duct as defined in claim 2, wherein the rear of the upper duct opening is inclined downwards from the guide of the upper duct so as to guide the air flow downwards to be concentrated to the upper portion of the inter cooler.

5. The dual air duct as defined in claim 1, wherein the guide of the upper duct has an upper flange that is formed throughout upper portion thereof and a lower flange that is formed through lower portion thereof and then inclined in a curve shape in diagonally upper direction within the main body of the upper duct.

6. The dual air duct as defined in claim 1, wherein the blocking plate includes an inclined portion to guide the air flow to the condenser.

7. The dual air duct as defined in claim 1, wherein an expanding portion is formed at the guide of the lower duct and extends to the outside of the intercooler.

8. The dual air duct as defined in claim 7, wherein the expanding portion extends from the guide of the lower duct to the outside of the intercooler in a curve shape.

9. The dual air duct as defined in claim 1, wherein an opening disposed in a middle portion of the guide of the lower duct is smaller than the rear of the lower duct opening so as to increase flow speed of the air flow.

10. The dual air duct as defined in claim 1, wherein the guide of the lower duct is inclined upwards so as to guide the air flow upwards to be concentrated to the lower portion of the intercooler.

11. The dual air duct as defined in claim 1, wherein the blocking plate is formed to the main body of the upper duct and configured to block the gap between the condenser and the intercooler.

12. The dual air duct as defined in claim 11, wherein the blocking plate includes an inclined surface that is inclined downwards from the main body of the upper duct toward the condenser in a traverse direction of the vehicle.

13. The dual air duct as defined in claim 1, wherein the upper duct and the lower duct are integrally formed.

14. The dual air duct as defined in claim 13, wherein main bodies and blocking plates of the upper and lower ducts are integrally formed.

15. The dual air duct as defined in claim 1, wherein the upper duct and lower duct are fastened to a front end module of a vehicle body.

16. The dual air duct as defined in claim 1, wherein the upper duct and lower duct are fastened to an upper cover and a lower stiffener.

17. A passenger vehicle comprising the dual air duct as defined in claim 1.

* * * * *